A. W. SMITH, Jr.
VASE.
APPLICATION FILED NOV. 30, 1909.

949,452.

Patented Feb. 15, 1910.

UNITED STATES PATENT OFFICE.

ANTHONY W. SMITH, JR., OF PITTSBURG, PENNSYLVANIA.

VASE.

949,452.

Specification of Letters Patent.   Patented Feb. 15, 1910.

Application filed November 30, 1909. Serial No. 530,681.

*To all whom it may concern:*

Be it known that I, ANTHONY W. SMITH, Jr., a resident of Pittsburg, in the county of Allegheny and State of Pennsylvania, have invented certain new and useful Improvements in Vases, of which the following is a specification.

My invention relates to improvements in vases, and more particularly to that class of vases designed to contain a bunch or cluster of cut flowers.

An object of the present invention is to provide a new and improved vase particularly designed for the use of florists in displaying and selling cut flowers, and a characteristic and important feature thereof is the provision of an interior binding or stem-engaging edge designed to engage the stems of a bunch or cluster of flowers inserted in the vase and permit the withdrawal of one or more flowers separately without causing the whole cluster to be pulled out of the vase or any of the flowers to be removed except the one or those desired.

Further objects of my invention are to provide means for permitting the cluster or bunch of flowers placed in the vase to spread at the top and the stems thereof to separate at the bottom of the bunch. By forming the upper portion of the vase so as to allow the flowers to spread at the top permits a much better display to be made than were the flowers closely bunched, and by permitting the stems to separate I provide for a free circulation of water in the lower portion of the vase.

Figure 1:
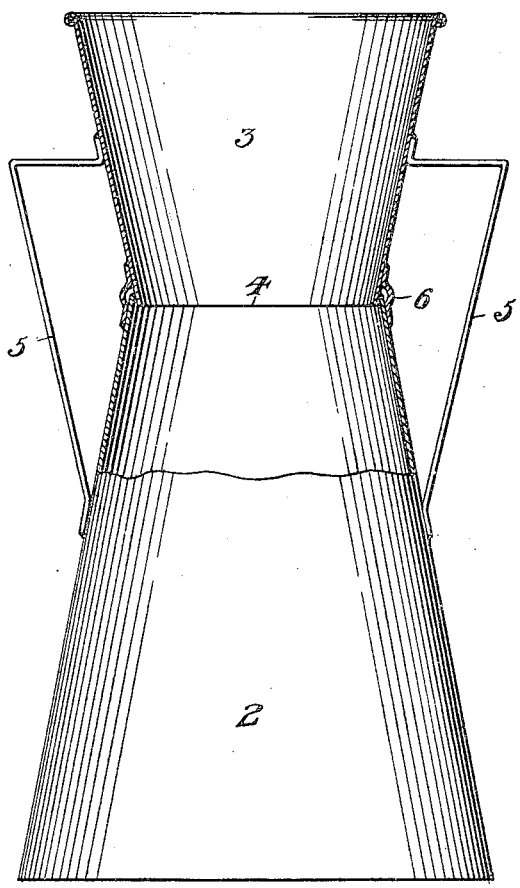
Figure 2:
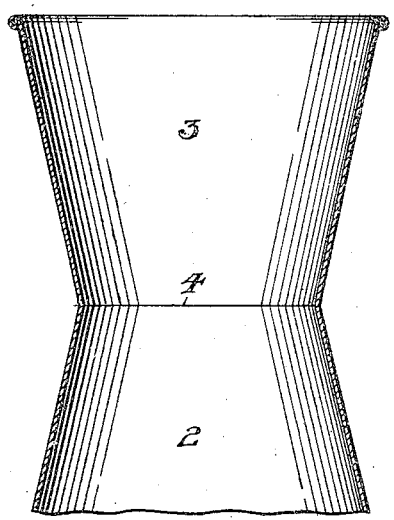
Figure 3:
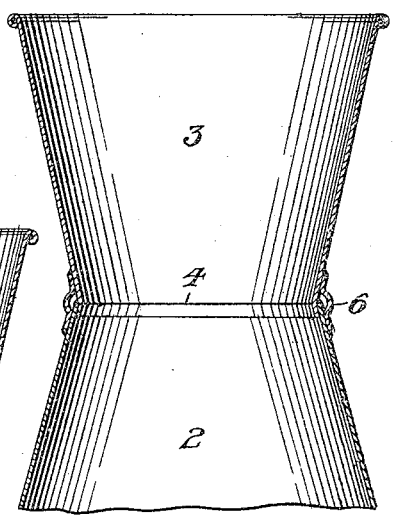
Figure 4:
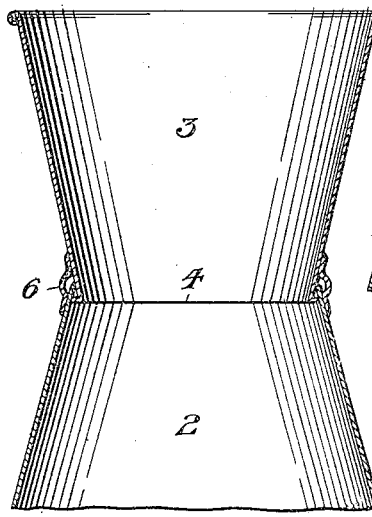

In the accompanying drawing, which illustrates applications of my invention, Figure 1, is a part elevational and a part sectional view of a vase embodying my invention. Figs. 2, 3, and 4 vertical sectional views showing modified forms of my invention.

Referring to the drawing, 2 designates the lower or bottom portion of the vase; this portion as illustrated and as preferred is in the form of a hollow cone; it may, however, be of a different shape.

3 designates the top or upper portion of the vase which is preferably, although not necessarily, of the form similar to the form of the lower or base portion 2. The upper portion may be formed integral with the base portion as shown by Fig. 2, or separate therefrom as shown by the other figures of the drawing. In all of the forms the walls of the said upper and lower portions meet at an angle to form an interior stem engaging or binding edge 4, which latter projects inwardly and engages the stems of the bunch of flowers placed in the vase.

The edge 4, in order to best carry out the function of retaining the bunch during the removal of a single flower from the bunch, should be a comparatively sharp edge as distinguished from a band or a rounded curved contracted portion.

As shown the dimensions or the cubical capacity of the lower portion is much greater than the upper portion.

The vase shown by the form of Fig. 1 is provided with handles 5, and an outside band 6. In the forms of Figs. 3 and 4, I show the band 6, but the handles are omitted.

What I claim is:

1. A vase of the character described, having a top portion and a lower portion with the walls of said portions meeting at an angle to form an interior edge.

2. A vase of the character described having a flaring upper portion, a flaring bottom portion of greater cubical capacity than the upper portion, the walls of said portions meeting at an angle to form an interior binding edge.

3. A vase of the character described having a flaring bottom portion, and a flaring top portion mounted on the bottom portion and having its lower edge overlapping the upper edge of the top portion to form an interior binding edge.

In testimony whereof I affix my signature in presence of two witnesses.

ANTHONY W. SMITH, JR.

Witnesses:
W. G. DOOLITTLE,
A. C. WAY.